US012649814B2

(12) United States Patent
Larimer et al.

(10) Patent No.: US 12,649,814 B2
(45) Date of Patent: Jun. 9, 2026

(54) FILIFORM CORROSION RESISTANT POLYESTER/ACRYLIC HYBRID COATING COMPOSITION

(71) Applicant: PPG Industries Ohio, Inc., Cleveland, OH (US)

(72) Inventors: Troy James Larimer, North Huntingdon, PA (US); Brian Edward Woodworth, Glenshaw, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 116 days.

(21) Appl. No.: 18/565,220

(22) PCT Filed: May 27, 2022

(86) PCT No.: PCT/US2022/072610

§ 371 (c)(1),
(2) Date: Nov. 29, 2023

(87) PCT Pub. No.: WO2022/256784

PCT Pub. Date: Dec. 8, 2022

(65) Prior Publication Data

US 2024/0270978 A1 Aug. 15, 2024

Related U.S. Application Data

(60) Provisional application No. 63/195,747, filed on Jun. 2, 2021.

(51) Int. Cl.

| | |
|---|---|
| ***C08G 18/42*** | (2006.01) |
| ***C08G 18/34*** | (2006.01) |
| ***C08G 18/40*** | (2006.01) |
| ***C08G 18/62*** | (2006.01) |
| ***C08G 18/80*** | (2006.01) |
| ***C09D 5/03*** | (2006.01) |
| ***C09D 5/08*** | (2006.01) |

(52) U.S. Cl.

CPC ........... *C08G 18/42* (2013.01); *C08G 18/341* (2013.01); *C08G 18/4063* (2013.01); *C08G 18/6237* (2013.01); *C08G 18/8061* (2013.01); *C09D 5/033* (2013.01); *C09D 5/037* (2013.01); *C09D 5/08* (2013.01)

(58) Field of Classification Search

CPC .. C08G 18/341; C08G 18/4063; C08G 18/42; C08G 18/4202; C08G 18/6237; C08G 18/8061; C09D 5/03; C09D 5/033; C09D 5/08

See application file for complete search history.

(56) References Cited

U.S. PATENT DOCUMENTS

| | | | |
|---|---|---|---|
| 3,989,767 A | 11/1976 | Homma et al. | |
| 5,407,747 A | 4/1995 | Sammel et al. | |
| 5,710,214 A | 1/1998 | Chou | |
| 6,204,310 B1 | 3/2001 | Choudhery | |
| 6,472,071 B2 * | 10/2002 | Dumain ............. | C08G 18/6237 427/195 |
| 7,723,410 B2 | 5/2010 | Daly et al. | |
| 10,626,277 B2 | 4/2020 | Iacob et al. | |
| 2003/0077469 A1 | 4/2003 | Schneider | |
| 2016/0355626 A1 | 12/2016 | Larson et al. | |
| 2017/0158869 A1 | 6/2017 | Martinoni et al. | |
| 2018/0319995 A1 | 11/2018 | Schlager et al. | |

FOREIGN PATENT DOCUMENTS

| | | | |
|---|---|---|---|
| EP | 2098575 | A1 | 9/2009 |
| JP | H0198672 | A | 4/1989 |
| JP | 01-282271 | A | 11/1989 |
| JP | H06506154 | A | 7/1994 |
| JP | 2005-146204 | A | 6/2005 |
| JP | 2015-054932 | A | 3/2015 |
| KR | 20120108194 | A | 10/2012 |
| WO | 1993013875 | A1 | 7/1993 |

OTHER PUBLICATIONS

International Search Report and Written Opinion received for PCT Application Serial No. PCT/US2022/072610 dated Aug. 31, 2022, 7 pages.

* cited by examiner

*Primary Examiner* — Gerard Higgins

(57) ABSTRACT

The present invention relates to a powder coating composition including: an epoxy functional acrylic polymer; a hydroxyl functional polyester polymer including a first hydroxyl functional polyester polymer having an acid value of up to 10 and a weight average molecular weight of up to 20,000 g/mol; an acid functional crosslinker; and a blocked polyisocyanate crosslinker, where the powder coating composition includes at least 45 weight % of a combined total of the hydroxyl functional polyester polymer and the blocked polyisocyanate crosslinker, based on the total resin solids in the powder coating composition.

19 Claims, No Drawings

FILIFORM CORROSION RESISTANT POLYESTER/ACRYLIC HYBRID COATING COMPOSITION

FIELD OF THE INVENTION

The present invention relates to powder coating compositions.

BACKGROUND OF THE INVENTION

Substrates, such as metal substrates including those used in vehicles, are often provided with coatings to provide corrosion resistance. For example, substrates have been coated with a corrosion-resistant coating to provide corrosion resistant properties. Coatings with corrosion resistant properties may be applied over said substrates to protect the substrates from corrosion over time.

SUMMARY OF THE INVENTION

The present invention is directed to a powder coating composition, including: an epoxy functional acrylic polymer; a hydroxyl functional polyester polymer including a first hydroxyl functional polyester polymer having an acid value of up to 10 and a weight average molecular weight of up to 20,000 g/mol; an acid functional crosslinker; and a blocked polyisocyanate crosslinker, where the powder coating composition includes at least 45 weight % of a combined total of the hydroxyl functional polyester polymer and the blocked polyisocyanate crosslinker, based on the total resin solids in the powder coating composition.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and the plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" crosslinker, "an" epoxy functional polymer, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a powder coating composition, comprising: an epoxy functional acrylic polymer; a hydroxyl functional polyester polymer comprising a first hydroxyl functional polyester polymer having an acid value of up to 10 and a weight average molecular weight of up to 20,000 g/mol; an acid functional crosslinker; and a blocked isocyanate crosslinker, wherein the powder coating composition comprises at least 45 weight % of a combined total of the hydroxyl functional polyester polymer and the blocked polyisocyanate crosslinker, based on the total resin solids in the powder coating composition.

The powder coating composition comprises an epoxy functional acrylic polymer. The epoxy functional acrylic polymer may be formed by any technique known in the art. For example, the epoxy functional acrylic polymer may be formed via addition polymerization, where the epoxy functional acrylic polymer is formed from the linking of monomers without the co-generation of other by-products. The components used to form the epoxy functional acrylic polymer may be solid at ambient temperatures (20° C.-25° C.).

The epoxy functional acrylic polymer of the powder coating composition may be derived from ethylenically unsaturated monomers (e.g., by emulsion polymerization). As used herein, "ethylenically unsaturated" refers to a group having at least one carbon-carbon double bond. Non-limiting examples of ethylenically unsaturated groups include, but are not limited to, (meth)acrylate groups, (meth)acrylamide groups, vinyl groups, or combinations thereof. As used herein, the term "(meth)acrylate" refers to both methacrylate and acrylate. Also, "(meth)acrylamide" and like terms refer to both acrylamide and methacrylamide.

The epoxy functional acrylic polymer is obtained from components comprising at least one epoxy functional ethylenically unsaturated monomer. For example, the epoxy functional acrylic polymer may be obtained from at least one epoxy functional ethylenically unsaturated (meth)acrylic monomer. The epoxy functional acrylic polymer may be obtained from additional components such as an additional ethylenically unsaturated monomer. The additional ethylenically unsaturated monomer may be different from the epoxy functional ethylenically unsaturated monomer.

Non-limiting examples of the epoxy functional ethylenically unsaturated monomer may include glycidyl methacrylate, glycidyl acrylate, 3,4-epoxy-1-butene, (R)-(+)-1,2-epoxy-9-decene. For example, one non-limiting epoxy functional ethylenically unsaturated monomer may include the Epoxy Embedding Medium kit commercially available from Sigma-Aldrich (St. Louis, MO). The epoxy functional ethylenically unsaturated (meth)acrylic monomer may include a mono-epoxy functional (meth)acrylate monomer.

The components used to form the epoxy functional acrylic polymer may comprise the epoxy functional ethylenically unsaturated monomer in an amount of greater than 5 weight %, or greater than 10 weight %, or greater than 15 weight %, or greater that 20 weight %, or greater than 30 weight %, or greater than 40 weight %, or greater than 50 weight %, based on the components that form the epoxy functional acrylic polymer. The components used to form the epoxy functional acrylic polymer may comprise the epoxy functional ethylenically unsaturated monomer in an amount of up to 70 weight %, or up to 60 weight %, or up to 50 weight %, or up to 40 weight %, or up to 30 weight %, based on the components that form the epoxy functional acrylic polymer. The components used to form the epoxy functional acrylic polymer may comprise the epoxy functional ethylenically unsaturated monomer in an amount in the range of from 5 weight % to 70 weight %, or in the range of from 10 weight % to 50 weight %, or in the range of from 10 weight % to 40 weight %, or in the range of from 15 weight % to 30 weight %, or in the range of from 20 weight % to 30 weight %, or in the range of from 10 weight % to 22 weight %, or in the range of from 15 weight % to 20 weight %, based on the components that form the epoxy functional acrylic polymer.

The epoxy functional ethylenically unsaturated monomer may include at least 1, or at least 2, or at least 3 epoxy functional groups in the epoxy functional ethylenically unsaturated monomer. The epoxy functional ethylenically unsaturated monomer may comprise exactly 1 epoxy functional group, such that the epoxy functional ethylenically unsaturated monomer is a mono-epoxy functional ethylenically unsaturated monomer. The epoxy functional ethylenically unsaturated monomer may include from 1 to 3 epoxy functional groups in the epoxy functional ethylenically unsaturated monomer.

The epoxy functional acrylic polymer may comprise at least 1, or at least 2, or at least 3 epoxy functional groups per repeat unit of the epoxy functional acrylic polymer. The epoxy functional acrylic polymer may comprise exactly 1 epoxy functional group per repeat unit of the epoxy functional acrylic polymer. The epoxy functional acrylic polymer may comprise from 1 to 3 epoxy functional groups per repeat unit of the epoxy functional acrylic polymer.

The additional ethylenically unsaturated monomer may comprise a mono-ethylenically unsaturated monomer, a multi-ethylenically unsaturated monomer, or a combination thereof. A mono-ethylenically unsaturated monomer refers to a monomer that comprises only one ethylenically unsaturated group, and a multi-ethylenically unsaturated monomer refers to a monomer that comprises two or more ethylenically unsaturated groups.

Non-limiting examples of additional ethylenically unsaturated monomers different from the epoxy functional ethylenically unsaturated monomers include, but are not limited to, alkyl esters of (meth)acrylic acid, hydroxylalkyl esters of (meth)acrylic acid, acid group containing ethylenically unsaturated monomers, vinyl monomers, (meth)acrylamide monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_2$-$C_{24}$ diols such as butane diol and hexane diol may also be used.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

Non-limiting examples of (meth)acrylamide monomers include acrylamide, methacrylamide, N,N-dimethylacrylamide, di-(meth)acrylamide functional monomers such as N,N'-methylenebisacrylamide, and combinations thereof.

The additional ethylenically unsaturated monomers may comprise a functional ethylenically unsaturated monomer different from the epoxy functional ethylenically unsaturated monomer. As used herein, the term "functional ethylenically unsaturated monomer" refers to an ethylenically unsaturated monomer that comprises a group, in addition to the ethylenically unsaturated carbon-carbon double bond, that is reactive with the functionality of another component of the powder coating composition. The functional ethylenically unsaturated monomer may have at least one of a variety of reactive functional groups including, but not limited to, amine groups, hydroxyl groups, thiol groups, carbamate groups, amide groups, urea groups, carboxyl groups, aldehyde groups, ester groups, ether groups, carbonyl groups, and combinations thereof. Non-limiting examples of functional ethylenically unsaturated monomers include esters of acrylic or methacrylic acid, and hydroxyl functional monomers such as hydroxyethyl methacrylate. In one non-limiting example, a functional ethylenically unsaturated monomer may include an additional group that is reactive with the functionality of another component of the powder coating composition, but that is not reactive with the epoxy functionality of the at least one epoxy functional ethylenically unsaturated monomer used to obtain the epoxy functional acrylic polymer.

The additional ethylenically unsaturated monomer may comprise a non-functional ethylenically unsaturated monomer. As used herein, the term "non-functional ethylenically unsaturated monomer" refers to an ethylenically unsaturated monomer that does not comprise a group, in addition to the ethylenically unsaturated double-double bond, that is reactive with the functionality of another component of the powder coating composition. The non-functional ethylenically unsaturated monomer may comprise an aliphatic non-functional ethylenically unsaturated monomer and/or an aromatic non-functional ethylenically unsaturated monomer. Non-limiting examples of non-functional ethylenically unsaturated monomers include styrene, methyl methacrylate, and n-butyl methacrylate.

The additional ethylenically unsaturated monomer may comprise at least one, at least two, at least three, at least four, or more different ethylenically unsaturated monomers. The additional ethylenically unsaturated monomer or monomers may comprise only functional ethylenically unsaturated monomers, or only non-functional ethylenically unsaturated monomers, or a combination of both functional and non-functional ethylenically unsaturated monomers. The additional ethylenically unsaturated monomer may include a plurality of different non-functional ethylenically unsaturated monomers. The non-functional ethylenically unsaturated monomers may comprise an aliphatic non-functional ethylenically unsaturated monomer and an aromatic non-functional ethylenically unsaturated monomer.

The components used to form the epoxy functional acrylic polymer may comprise the additional ethylenically unsaturated monomer in an amount of at least 50 weight %, or at least 55 weight %, or at least 60 weight %, or at least 65 weight %, or greater than 78 weight %, based on the components that form the epoxy functional acrylic polymer. The components used to form the epoxy functional acrylic polymer may comprise the additional ethylenically unsaturated monomer in an amount of up to 90 weight %, up to 85 weight %, or up to 80 weight %, or up to 75 weight %, based on the components that form the epoxy functional acrylic polymer. The components used to form the epoxy functional acrylic polymer may comprise the additional ethylenically unsaturated monomer in a range of from 50 weight % to 85 weight %, such as from 55 weight % to 80 weight %, or from 60 weight % to 75 weight %, or from 65 weight % to 75 weight %, or in the range of from 78 weight % to 90 weight %, based on the components that form the epoxy functional acrylic polymer.

The epoxy functional acrylic polymer may have a number average molecular weight of at least 1,000 g/mol, or at least 2,000 g/mol. The epoxy functional acrylic polymer may have a number average molecular weight of up to 8,000 g/mol, or up to 5,000 g/mol. The epoxy functional acrylic polymer may have a number average molecular weight in the range of from 1,000 g/mol to 8,000 g/mol, such as from 2,000 g/mol to 5,000 g/mol.

The epoxy functional acrylic polymer may have a weight average molecular weight of at least 2,000 g/mol, or at least 3,000 g/mol, or at least 4,000 g/mol, or at least 5,000 g/mol. The epoxy functional acrylic polymer may have a weight average molecular weight of up to 20,000 g/mol, or up to 16,000 g/mol, or up to 15,000 g/mol, or up to 12,000 g/mol, or up to 10,000 g/mol. The epoxy functional acrylic polymer may have a weight average molecular weight in the range of from 2,000 g/mol to 20,000 g/mol, or in the range of from 3,000 g/mol to 16,000 g/mol, or in the range of from 3,000 g/mol to 15,000 g/mol, or in the range of from 4,000 g/mol to 12,000 g/mol, or in the range of from 5,000 g/mol to 10,000 g/mol. For example, the epoxy functional acrylic polymer may have a weight average molecular weight in the range of from 7,000 g/mol to 8,000 g/mol.

Molecular weight (both number and weight average), as used herein, is determined by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da).

The epoxy functional acrylic polymer may have a Tg of at least 25° C., or at least 30° C., or at least 40° C., or at least 50° C. The epoxy functional acrylic polymer may have a Tg of up to 175° C., or up to 150° C., or up to 100° C., or up to 90° C., or up to 80° C., or up to 70° C. The epoxy functional acrylic polymer may have a Tg in the range of from 25° C. to 175° C., or in the range of from 25° C. to 150° C., or in the range of from 25° C. to 100° C., or in the range of from 25° C. to 90° C., or in the range of from 30° C. to 90° C., or in the range of from 40° C. to 90° C., or in the range of from 40° C. to 80° C., or in the range of from 50° C. to 80° C., or in the range of from 50° C. to 70° C. As used herein, the term "Tg" refers to glass transition temperature measured by differential scanning calorimetry according to ASTM D3418-12, unless otherwise indicated.

The epoxy functional acrylic polymer may comprise a thermoset polymer. As used herein, a "thermoset" polymer refers to a resin that "sets" irreversibly upon curing or crosslinking, wherein the polymer chains of the polymeric components are joined together by covalent bonds. Once cured or crosslinked, a thermoset polymer will not melt upon the application of heat and is insoluble in solvents. Further, as used herein, a "thermoplastic" polymer refers to a polymer that includes polymeric components that are not joined by covalent bonds and, thereby, can undergo liquid flow upon heating and are soluble in solvents.

The powder coating composition may include the epoxy functional acrylic polymer in an amount of at least 5 weight %, or at least 10 weight %, or at least 15 weight %, or at least 18 weight %, or at least 20 weight %, based on the total resin solids weight of the powder coating composition. The powder coating composition may include the epoxy functional acrylic polymer in an amount of up to 53 weight %, or up to 50 weight %, or up to 45 weight %, or up to 40 weight %, or up to 35 weight %, or up to 30 weight %, based on the total resin solids weight of the powder coating composition. The powder coating composition may include the epoxy functional acrylic polymer in an amount in the range of from 5 weight % to 53 weight %, or in the range of from 5 weight % to 50 weight %, or in the range of from 10 weight % to 45 weight %, or in the range of from 15 weight % to 40 weight %, or in the range of from 18 weight % to 35 weight, or in the range of from 20 weight % to 30 weight %, based on the total resin solids weight of the powder coating composition.

The powder coating composition includes a hydroxyl functional polyester polymer. The powder coating composition may include the hydroxyl functional polyester polymer in an amount of at least 35 weight %, or at least 45 weight %, or at least 55 weight %, or at least 65 weight %, based on the total resin solids weight of the powder coating composition. The powder coating composition may include the hydroxyl functional polyester polymer in an amount of up to 89 weight %, or up to 85 weight %, or up to 80 weight %, based on the total resin solids weight of the powder coating composition. The powder coating composition may include the hydroxyl functional polyester polymer in an amount in the range of from 35 weight % to 89 weight %, or in the range of from 45 weight % to 85 weight %, or in the range of from 55 weight % to 85 weight %, or in the range of from 55 weight % to 80 weight, or in the range of from 65 weight % to 80 weight %, based on the total resin solids weight of the powder coating composition.

The hydroxyl functional polyester polymer may include a first hydroxyl functional polyester polymer. The first hydroxyl functional polyester polymer may be formed by any technique known in the art. For example, the first hydroxyl functional polyester polymer may be formed via step-growth polymerization, where the first hydroxyl functional polyester polymer is formed from the reaction of bi-functional or multifunctional monomers to form first dimers, then trimers, then oligomers, and eventually long chain polymers. The step-growth polymerization that forms the first hydroxyl functional polyester polymer may be a condensation polymerization, where the reaction of the bi-functional or multifunctional monomers co-generates a byproduct compound. For example, the condensation polymerization of the first hydroxyl functional polyester polymer may cogenerate a byproduct compound, such as water or HCl. The components used to form the first hydroxyl functional polyester polymer may be solid at ambient temperatures (20° C.-25° C.). For example, the first hydroxyl functional polyester polymer may be solid at ambient temperatures (20° C.-25° C.).

The first hydroxyl functional polyester polymer may be a reaction product formed from a mixture of reactants. The mixture of reactants used to form the first hydroxyl functional polyester polymer may comprise any number of reactants. For example, the first hydroxyl functional polyester polymer may be a reaction product formed from a mixture of reactants comprising a polyol and a polyacid.

For example, the mixture of reactants used to form the first hydroxyl functional polyester polymer may comprise a polyol. As used herein, a "polyol" refers to a compound that comprises 2 or more hydroxyl groups. For example, the polyol of the mixture of reactants may comprise 3 or more hydroxyl groups, or 4 or more hydroxyl groups, or 5 or more hydroxyl groups. The polyol of the mixture of reactants may comprise up to 6 hydroxyl groups, or up to 5 hydroxyl groups, or up to 4 hydroxyl groups. The polyol of the mixture of reactants may comprise from 2 to 6 hydroxyl groups, or from 3 to 6 hydroxyl groups, or from 3 to 5 hydroxyl groups, or from 3 to 4 hydroxyl groups.

Suitable polyols for preparation of the first hydroxyl functional polyester polymer include, but are not limited to any polyols known for making polyesters. Examples include, but are not limited to, alkylene glycols, such as ethylene glycol, propylene glycol, diethylene glycol, dipropylene glycol, 1,2-propylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; 2,2,4-trimethyl-1,3-pentanediol, cyclohexanedimethanol; hexanediols including 1,6-hexanediol; 2-ethyl-1,3-hexanediol, caprolactonediol (for example, the reaction product of epsilon-caprolactone and ethylene glycol); hydroxyalkylated bisphenols; polyether glycols, for example, poly(oxytetramethylene) glycol; trimethylol propane, di-trimethylol propane, pentaerythritol, di-pentaerythritol, trimethylol ethane, trimethylol butane, dimethylol cyclohexane, glycerol, tris(2-hydroxyethyl) isocyanurate and the like.

The mixture of reactants used to form the first hydroxyl functional polyester polymer may comprise a combination of polyols. For example, the mixture of reactants used to form the first hydroxyl functional polyester polymer may comprise at least 2 different polyols, or at least 3 different polyols, or at least 4 different polyols.

The mixture of reactants used to form the first hydroxyl functional polyester polymer may comprise a polyacid. As used herein, a "polyacid" refers to a compound having two or more acid or acid equivalent groups (or combination thereof) and includes the ester and or anhydride of the acid. By "acid equivalent groups", it is meant that the non-double bonded oxygen in the acid group has been substituted with another component, such as a halide component. Thus, the polyacid may include a polyacid halide or other polyacid equivalent.

Suitable polyacids for preparation of the first hydroxyl functional polyester polymer include, but are not limited to, polyacids such as terephthalic acid, isophthalic acid, adipic acid, azelaic acid, sebacic acid, succinic acid, glutaric acid, octadecanedioic acid, hexadecanedioic acid, tetradecanedioic acid, decanoic diacid, dodecanoic diacid, cyclohexanedioic acid, hydrogenated $C_{36}$ dimer fatty acids, and esters and anhydrides thereof. Suitable polyacids include polyacid halides.

The mixture of reactants used to form the first hydroxyl functional polyester polymer may comprise a combination of polyacids. For example, the mixture of reactants used to form the first hydroxyl functional polyester polymer may comprise at least 2 different polyacids, or at least 3 different polyacids, or at least 4 different polyacids.

The mixture of reactants used to form the first hydroxyl functional polyester polymer may include additional monomers. For example, the mixture of reactants used to form the first hydroxyl functional polyester polymer may include an epoxy functional monomer. Alternatively, the mixture of reactants used to form the first hydroxyl functional polyester polymer may be substantially free, essentially free, or completely free of an epoxy functional monomer. The phrase "substantially free of an epoxy functional monomer" means that the mixture of reactants used to form the first hydroxyl functional polyester polymer contains less than 1 weight % of an epoxy functional monomer based on the total resin solids weight of the mixture of reactants used to form the first hydroxyl functional polyester polymer, "essentially free of an epoxy functional monomer" means that the mixture of reactants used to form the first hydroxyl functional polyester polymer contains less than 0.5 weight % of an epoxy functional monomer based on the total resin solids weight of the mixture of reactants used to form the first hydroxyl functional polyester polymer, and "completely free of an epoxy functional monomer" means that the mixture of reactants used to form the first hydroxyl functional polyester polymer contains less than 0.1 weight % of an epoxy functional monomer based on the total resin solids weight of the mixture of reactants used to form the first hydroxyl functional polyester polymer.

In one non-limiting embodiment, the mixture of reactants used to form the first hydroxyl functional polyester polymer does not include an epoxy functional monomer. As such, the resultant first hydroxyl functional polyester polymer may not include epoxy functionality.

The mixture of reactants used to form the first hydroxyl functional polyester polymer may include additional components. Non-limiting examples of additional components that may be used to form the first hydroxyl functional polyester polymer include (meth)acrylic functional monomers, silane functional monomers, and combinations thereof. Alternatively, the mixture of reactants used to form the first hydroxyl functional polyester polymer may not comprise (meth)acrylic functional monomers, silane functional monomers, and/or combinations thereof.

The first hydroxyl functional polyester polymer may have an acid value of up to 10, or up to 8, or up to 5, or up to 3, or up to 1. For example, the first hydroxyl functional polyester polymer may comprise no carboxylic acid functional groups, such that the first hydroxyl functional polyester polymer has an acid value of 0. A first hydroxyl functional polyester polymer with a high enough acid value may lead to an increase in the gelling rate of the coating composition and cause the first hydroxyl functional polyester polymer to react with the epoxy functional acrylic polymer which may not produce the desired filiform corrosion resistance or physical properties. As used herein, "acid value" is determined according to ASTM D1639, except that a pH electrode was used for endpoint determination and a 20/80 ratio of proplyene glycol/tetrahydrofuran for the solvent used for titration.

The first hydroxyl functional polyester polymer may have a hydroxyl value of at least 20, or at least 25, or at least 30. The first hydroxyl functional polyester polymer may have a hydroxyl value of up to 200, or up to 150, or up to 100, or up to 75, or up to 50. The first hydroxyl functional polyester polymer may have a hydroxyl value in the range of from 20 to 200, or in the range of from 25 to 100, or in the range of from 30 to 100, or in the range of from 30 to 75, or in the range of from 30 to 50. As used herein, "hydroxyl value" is determined by esterification of the sample with excess acetic anhydride at room temperature. The excess acetic anhydride is converted to acetic acid by hydrolysis and titrated potentiometrically with standard potassium hydroxide. The volume difference, in millimeters, between a blank determination (no reaction) and the sample determination corresponds to the hydroxyl content of the sample.

The first hydroxyl functional polyester polymer may have a weight average molecular weight of at least 500 g/mol, or at least 1,000 g/mol, or at least 2,000 g/mol, or at least 5,000 g/mol. The first hydroxyl functional polyester polymer may have a weight average molecular weight of up to 20,000 g/mol, or up to 17,000 g/mol, or up to 15,000 g/mol, or up to 12,000 g/mol, or up to 10,000 g/mol, or up to 9,000 g/mol. The first hydroxyl functional polyester polymer may have a weight average molecular weight in the range of from 500 g/mol to 20,000 g/mol, or in the range of from 1,000 g/mol to 17,000 g/mol, or in the range of from 2,000 g/mol to 15,000 g/mol, or in the range of from 2,000 g/mol to 12,000 g/mol, or in the range of from 5,000 g/mol to 9,000 g/mol.

The first hydroxyl functional polyester polymer may comprise a thermoset polymer.

The hydroxyl functional polyester polymer may comprise the first hydroxyl functional polyester polymer and only the first hydroxyl functional polyester polymer. If the hydroxyl functional polyester polymer comprises only the first hydroxyl functional polyester polymer, the powder coating composition may include the first hydroxyl functional polyester polymer in an amount of at least 35 weight %, or at least 45 weight %, or at least 55 weight %, or at least 65 weight %, based on the total resin solids weight of the powder coating composition. The powder coating composition may include the first hydroxyl functional polyester polymer in an amount of up to 89 weight %, or up to 85 weight %, or up to 80 weight %, based on the total resin solids weight of the powder coating composition. The powder coating composition may include the first hydroxyl functional polyester polymer in an amount in the range of from 35 weight % to 89 weight %, or in the range of from 45 weight % to 85 weight %, or in the range of from 55 weight % to 85 weight %, or in the range of from 55 weight % to 80 weight, or in the range of from 65 weight % to 80 weight %, based on the total resin solids weight of the powder coating composition.

The hydroxyl functional polyester polymer may comprise more than one hydroxyl functional polyester polymer. The hydroxyl functional polyester may comprise at least one, or at least 2, or at least 3, or at least 4, or at least 5 different hydroxyl functional polyester polymers. For example, the hydroxyl functional polyester polymer may comprise a first hydroxyl functional polyester polymer and a second hydroxyl functional polyester polymer. The second hydroxyl functional polyester polymer may be different from the first hydroxyl functional polyester polymer. The second hydroxyl functional polyester polymer of the powder coating composition may be a reaction product formed from a mixture of reactants, such as previously described in connection with the first hydroxyl functional polyester polymer. The components used to form the second hydroxyl functional polyester polymer may be solid at ambient temperatures (20° C.-25° C.). The second hydroxyl functional polyester polymer may be solid at ambient temperatures (20° C.-25° C.).

The second hydroxyl functional polyester polymer may have a hydroxyl value that is greater than a hydroxyl value of the first hydroxyl functional polyester polymer. The second hydroxyl functional polyester polymer may comprise a hydroxyl value of at least 80, or at least 100, or at least 150, or at least 200, or at least 250.

In one non-limiting embodiment, the hydroxyl functional polyester polymer may comprise a first hydroxyl functional polyester polymer and a second hydroxyl functional polyester polymer, where the first hydroxyl functional polyester polymer may have a hydroxyl value of from 30 to 75, and the second hydroxyl functional polyester polymer may have a hydroxyl value of at least 80. In another non-limiting embodiment, the hydroxyl functional polyester polymer may comprise a first hydroxyl functional polyester polymer and a second hydroxyl functional polyester polymer, where the first hydroxyl functional polyester polymer may have a hydroxyl value of from 30 to 50, and the second hydroxyl functional polyester polymer may have a hydroxyl value of at least 100.

The second hydroxyl functional polyester polymer may have an acid value of up to 10, or up to 8, or up to 5, or up to 3, or up to 1. For example, the second hydroxyl functional polyester polymer may comprise no carboxylic acid functional groups, such that the second hydroxyl functional polyester polymer has an acid value of 0.

The second hydroxyl functional polyester polymer may comprise a thermoset polymer.

If the hydroxyl functional polyester polymer comprises a first hydroxyl functional polyester polymer and a second hydroxyl functional polyester polymer, the powder coating composition may comprise the first hydroxyl functional polyester polymer in an amount of at least 15 weight %, or at least 20 weight %, or at least 25 weight %, or at least 30 weight %, based on the total resin solids weight of the powder coating composition. The powder coating composition may include the first hydroxyl functional polyester polymer in an amount of up to 86 weight %, or up to 78 weight %, or up to 70 weight %, or up to 60 weight %, or up to 50 weight %, or up to 40 weight %, based on the total resin solids weight of the powder coating composition. The powder coating composition may include the first hydroxyl functional polyester polymer in an amount in the range of from 15 weight % to 86 weight %, or in the range of from 20 weight % to 78 weight %, or in the range of from 20 weight % to 70 weight %, or in the range of from 25 weight % to 60 weight %, or in the range of from 25 weight % to 50 weight %, or in the range of from 30 weight % to 40 weight %, based on the total resin solids weight of the powder coating composition.

If the hydroxyl functional polyester polymer comprises a first hydroxyl functional polyester polymer and a second hydroxyl functional polyester polymer, the powder coating composition may comprise the second hydroxyl functional polyester polymer in an amount of at least 3 weight %, or at least 6 weight %, or at least 10 weight %, or at least 15 weight %, based on the total resin solids weight of the powder coating composition. The powder coating composition may include the second hydroxyl functional polyester polymer in an amount of up to 40 weight %, or up to 30 weight %, or up to 25 weight %, or up to 20 weight %, based on the total resin solids weight of the powder coating composition. The powder coating composition may include the second hydroxyl functional polyester polymer in an amount in the range of from 3 weight % to 40 weight %, or in the range of from 6 weight % to 30 weight %, or in the range of from 10 weight % to 25 weight %, or in the range of from 15 weight % to 20 weight %, based on the total resin solids weight of the powder coating composition.

The first hydroxyl functional polyester polymer and the epoxy functional acrylic polymer may each comprise a thermoset polymer. The first and second hydroxyl functional polyester polymers and the epoxy functional acrylic polymer may each comprise a thermoset polymer.

The powder coating composition includes an acid functional crosslinker. As used herein, a "crosslinker" refers to a chemical species comprising two or more functional groups that are reactive with other functional groups and which is capable of linking two or more monomers or polymer molecules through covalent bonds. The acid functional crosslinker may be reactive with epoxide groups, such as the epoxide groups of the epoxy functional acrylic polymer. The acid functional crosslinker may be solid at ambient temperature (20° C.-25° C.).

The acid functional crosslinker may include various types of polyacids. The acid functional crosslinker may comprise a $C_3$-$C_{30}$ alkyl, alkenyl, or alkynyl compound with two or more carboxylic acid functional groups. The acid functional crosslinker may be described by the formula:

$$HO_2C—[(CH_2)_n]—CO_2H$$

wherein n is an integer within the range of from 1 to 18. Examples of carboxylic acid functional crosslinkers include polycarboxy compounds such as dodecanedioic acid and its derivatives, isophthalic acid, terephthalic acid, azelaic acid, adipic acid, succinic acid, pimelic acid, sebacic acid, octadecanedioic acid, and the like. Further examples of aliphatic dicarboxylic acids include 1,2-, 1,3-, and 1,4-cyclohexane dicarboxylic acid. Further examples of aliphatic polycarboxylic acid compounds include maleic acid, citric acid, itaconic acid, aconitic acid, and the like.

The acid functional crosslinker may comprise a carboxylic acid group-containing polymer. Examples of carboxylic acid group-containing polymers include acrylic polymers, polyester polymers, and polyurethane polymers, where the acrylic, polyester, and/or polyurethane polymer contains 2 or more carboxylic acid groups.

The acid functional crosslinker may comprise a combination of polyacids. The combination of polyacids may include any of the polyacids previously disclosed as suitable for use in the acid functional crosslinker. For example, the acid functional crosslinker may comprise a combination of at least 2, or at least 3, or at least 4, or at least 5 polyacids. In one non-limiting embodiment, the acid functional crosslinker comprises a combination of polyacids including sebacic acid and dodecanoic acid.

The acid functional crosslinker may comprise a multifunctional acid functional crosslinker that comprises 2 or more carboxylic acid groups, or 3 or more carboxylic acid groups, or 4 or more carboxylic acid groups. The acid functional crosslinker may comprise a difunctional acid functional crosslinker comprising 2 carboxylic acid groups.

The powder coating composition may comprise the acid functional crosslinker in an amount of at least 2 weight %, or at least 5 weight %, or at least 10 weight %, or at least 15 weight %, based on the total resin solids weight of the powder coating composition. The powder coating composition may include the acid functional crosslinker in an amount of up to 30 weight %, or up to 25 weight %, or up to 22 weight %, or up to 20 weight %, based on the total resin solids weight of the powder coating composition. The powder coating composition may include the acid functional crosslinker in an amount in the range of from 2 weight % to 30 weight %, or in the range of from 5 weight % to 25 weight %, or in the range of from 10 weight % to 22 weight %, or in the range of from 15 weight % to 20 weight %, based on the total resin solids weight of the powder coating composition.

The acid functional crosslinker may react with the epoxy functional acrylic polymer to form a reaction product including at least one hydroxyl group. At least one acid group of the crosslinker may react with at least one epoxy group of the epoxy functional acrylic polymer.

The powder coating composition may comprise a ratio of epoxy groups to carboxylic acid groups of greater than 0.6:1, or greater than 0.8:1, or greater than 1:1. The powder coating composition may comprise a ratio of epoxy groups to carboxylic acid groups of up to 3:1, or up to 2:1, or up to 1.75:1, or up to 1.5:1. The powder coating composition may comprise a ratio of epoxy groups to carboxylic acid groups in the range of from 0.6:1 to 3:1, or in the range of from 0.8:1 to 2:1, or in the range of from 1:1 to 1.75:1, or in the range of from 1:1 to 1.5:1.

The powder coating composition may include a combined total of the epoxy functional acrylic polymer and the acid functional crosslinker in an amount of at least 10 weight %, or at least 15 weight %, or at least 20 weight %, or at least 25 weight %, or at least 30 weight %, based on the total resin solids weight of the powder coating composition. The powder coating composition may include a combined total of the epoxy functional acrylic polymer and the acid functional crosslinker in an amount of up to 55 weight %, or up to 50 weight %, or up to 45 weight %, or up to 40 weight %, based on the total resin solids weight of the powder coating composition. The powder coating composition may include a combined total of the epoxy functional acrylic polymer and the acid functional crosslinker in the range of from 10 weight % to 55 weight %, or in the range of from 15 weight % to 50 weight %, or in the range of from 20 weight % to 45 weight %, or in the range of from 25 weight % to 40 weight %, or in the range of from 30 weight % to 40 weight %, based on the total resin solids weight of the powder coating composition.

The powder coating composition includes a blocked polyisocyanate crosslinker. As used herein, a "polyisocyanate" refers to a compound that contains 2 or more isocyanate functional groups. The blocked polyisocyanate crosslinker (once unblocked) may comprise 2 or more isocyanate functional groups reactive with hydroxyl groups, such as the hydroxyl groups of the hydroxyl functional polyester polymer. The blocked polyisocyanate crosslinker may be solid at ambient temperature (20° C.-25° C.).

Polyisocyanates that may be used include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

In some examples, two or more isocyanate functional crosslinkers may be linked together as dimers and/or trimers to form a polyisocyanate, such as a trimer of IPDI.

As used herein, the term "blocked isocyanate" refers to a compound with isocyanate functional groups that are internally blocked and/or have been reacted with an external blocking agent and which prevents the isocyanate functionality from reacting until the internal blocking and/or external blocking agent is removed, such as upon exposure to an external stimulus such as heat. Non-limiting examples of external blocking agents include phenols, pyridinols, thiophenols, methylethylketoxime, amides, caprolactam (e.g., ε-caprolactam), imidazoles, triazoles, malonates, oximes, phenols, alcohols, pyrazoles, and combinations thereof. The blocked isocyanate crosslinker may be internally blocked. The blocked isocyanate crosslinker may include an uretdione isocyanate, such as an uretdione internally blocked isocyanate adduct.

The polyisocyanate crosslinker may comprise a ε-caprolactam-blocked isophorone diisocyanate. The ε-caprolactam-blocked isophorone diisocyanate may primarily include a blocked, difunctional, monomeric isophorone diisocyanate, such as a mixture of cis and trans isomers of 3-isocyanatomethyl-3,5,5-trimethylcyclohexylisocyanate, the blocked, difunctional dimer thereof, the blocked, trifunctional trimer thereof, or a mixture of the monomeric, dimeric, and/or trimeric forms. The polyisocyanate crosslinker may comprise a mixture comprising ε-caprolactam-blocked, difunctional, monomeric isophorone diisocyanate and the ε-caprolactam-blocked, trifunctional trimer of isophorone diisocyanate.

The polyisocyanate crosslinker may comprise an adduct of the 1,3-diazetidine-2,4-dione dimer of isophorone diisocyanate and a diol having the structure:

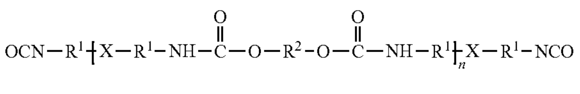

wherein n is greater than or equal to 1, and $R^1$ is a divalent 1-methylene-1,3,3-trimethyl-5-cyclohexyl radical, e.g., a radical having the structure:

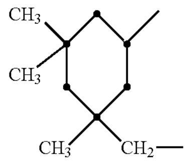

$R^2$ is a divalent aliphatic, cycloaliphatic, araliphatic or aromatic residue of a diol; and X is a 1,3-diazetidine-2,4-dionediyl radical, e.g., a radical having the structure:

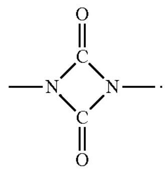

The ratio of NCO to OH groups in the formation of the adduct may be from 1:0.5 to 1:0.9. The mole ratio of diazetidinedione to diol may be from 2:1 to 10:9. The content of free isocyanate groups in the adduct may be not greater than 8 weight %. The adduct may have a weight or number molecular weight of from 500 to 4000 and a melting point and/or Tg of from 40° C. to 130° C. As used herein, melting point is measured using differential scanning calorimetry according to ASTM D3418-12, unless otherwise stated.

The adducts of the 1,3-diazetidine-2,4-dione dimer of isophorone diisocyanate and a diol may be prepared by reacting the diazetidine dimer of isophorone diisocyanate, in some examples free of isocyanurate trimers of isophorone diisocyanate, with diols in a ratio of reactants which gives as isocyanto:hydroxyl ratio of from 1:0.5 to 1:0.9, such as from 1:0.6 to 1:0.8. The adduct may have a weight or number average molecular weight of from 1450 to 2800 and a melting point of from 85° C. to 120° C. The diol reactant may include 1,4-butanediol.

For example, the blocked polyisocyanate crosslinker may comprise a uretidone blocked polyisocyanate and/or an externally blocked polyisocyanate commercially available from Evonik Industries (Essen, Germany).

The powder coating composition may comprise the blocked polyisocyanate crosslinker in an amount of at least 1 weight %, or at least 5 weight %, or at least 10 weight %, or at least 15 weight %, or at least 18 weight %, based on the total resin solids weight of the powder coating composition. The powder coating composition may include the blocked polyisocyanate crosslinker in an amount of up to 55 weight %, or up to 50 weight %, or up to 40 weight %, or up to 30 weight %, based on the total resin solids weight of the powder coating composition. The powder coating composition may include the blocked polyisocyanate crosslinker in an amount in the range of from 1 weight % to 55 weight %, or in the range of from 5 weight % to 50 weight %, or in the range of from 10 weight % to 40 weight %, or in the range of from 15 weight % to 30 weight, or in the range of from 18 weight % to 25 weight %, based on the total resin solids weight of the powder coating composition.

The blocked polyisocyanate crosslinker may become unblocked when the powder coating composition is heated to a temperature of at least 100° C., or at least 120° C., or at least 150° C., or at least 180° C., rendering the isocyanate groups available to react with the hydroxyl groups of the hydroxyl functional polyester polymer. The crosslinking reaction between the polyisocyanate crosslinker and the hydroxyl functional polyester polymer may provide the resultant coating with improved acid etch resistance.

The powder coating composition may comprise a ratio of isocyanate groups to hydroxyl groups of greater than 1:1, or greater than 1.1:1, or greater than 1.2:1, or greater than 1.4:1, or greater than 2:1. The powder coating composition may comprise a ratio of isocyanate groups to hydroxyl groups of up to 3:1, or up to 2:1, or up to 1.8:1, or up to 1.6:1. The powder coating composition may comprise a ratio of isocyanate groups to hydroxyl groups in the range of from 1:1 to 3:1, or in the range of from 1:1 to 2:1, or in the range of from 1.1:1 to 1.8:1, or in the range of from 1.2:1 to 1.6:1.

The powder coating composition may include a combined total of the hydroxyl functional polyester polymer and the blocked polyisocyanate crosslinker in an amount of at least 45 weight %, or at least 50 weight %, or at least 55 weight %, or at least 60 weight %, or at least 65 weight %, based on the total resin solids weight of the powder coating composition. The powder coating composition may include a combined total of the hydroxyl functional polyester polymer and the blocked polyisocyanate crosslinker in an amount of up to 90 weight %, or up to 85 weight %, or up to 80 weight %, or up to 77 weight %, based on the total resin solids weight of the powder coating composition. The powder coating composition may include a combined total of the hydroxyl functional polyester polymer and the blocked polyisocyanate crosslinker in the range of from 45 weight % to 90 weight %, or in the range of from 50 weight % to 85 weight %, or in the range of from 55 weight % to 80 weight %, or in the range of from 60 weight % to 80 weight %, or in the range of from 65 weight % to 77 weight %, based on the total resin solids weight of the powder coating composition.

The powder coating composition may include additional materials. Non-limiting examples of materials that may be included in the powder coating composition include plasticizers, anti-oxidants, flow agents, surface control agents (e.g., anti-cratering additives), thixotropic agents, slip aids, catalysts, anti-gassing agents such as benzoin, reaction inhibitors (e.g., corrosion inhibitors), texturizers, UV absorbers, thermal antioxidant stabilizers, light stabilizers (e.g., hindered amine light stabilizers (HALS)), and other customary auxiliaries.

The powder coating composition may include a pigment. Alternatively, the powder coating composition may be substantially free, essentially free, or completely free of a pigment. The phrase "substantially free of a pigment" means that the coating composition contains less than 5 weight % of a pigment based on the total solids weight of the powder coating composition, "essentially free of a pigment" means that the coating composition contains less than 1 weight % of a pigment based on the total solids weight of the powder coating composition, and "completely free of a pigment" means that the coating composition contains less than 0.1 weight % of a pigment based on the total solids weight of the powder coating composition.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof.

The present invention also relates to an article at least partially coated with a coating formed from the powder coating composition described herein to form a coated article. The article may comprise at least one substrate coated with the coating composition. The coating composition may be applied to the substrate to form a coating layer thereover. For example, the powder coating composition may be applied to vehicle substrates, including automotive substrates, industrial substrates, aerospace substrates, marine substrates, packaging substrates, electronics, architectural substrates, and the like.

In the present disclosure, the term "vehicle" is used in its broadest sense and includes all types of aircraft, spacecraft, watercraft, and ground vehicles. For example, the vehicle can include, but is not limited to an aerospace substrate, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like. The vehicle can also include a ground vehicle such as, for example, animal trailers (e.g., horse trailers), cars, trucks, buses, vans, heavy duty equipment, golf carts, motorcycles, bicycles, trains, railroad cars, and the like. The vehicle can also include watercraft such as, for example, ships, boats, hovercraft, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

Suitable architectural substrates over which the coating compositions may be applied include, but are not limited to, metallic or non-metallic substrates including: concrete, stucco, masonry elements, cement board, MDF (medium density fiberboard) and particle board, gypsum board, wood, stone, metal, plastics (e.g., vinyl siding and recycled plastics), wall paper, textiles, plaster, fiberglass, ceramic, and the like, which may be pre-primed by waterborne or solvent borne primers. The architectural substrate may be an interior wall (or other interior surface) of a building or residence. The architectural substrate may be an outdoor substrate exposed to outdoor conditions. The architectural substrate may be smooth or textured.

Specific non-limiting substrates include cars, trucks, ships, vessels, on-shore and off-shore installations, storage tanks, windmills, power industry substrates such as nuclear plants, power wires, batteries and battery components, bus bars, metal wires, copper or aluminum conductors, wood flooring and furniture, apparel, housings and circuit boards, glass and transparencies, sports equipment, including golf balls, stadiums, buildings, bridges, and the like.

The powder coating composition may be applied over at least a portion of a substrate comprising a metal wheel, such as a metal wheel included as a component of a vehicle, such as a metal wheel of an automobile. The metal wheel may comprise aluminum, steel, magnesium, or an alloy thereof. The powder coating composition may be applied over at least a portion of the metal wheel. The powder coating composition may be applied as a monocoat over the metal wheel or as a coating layer in a multi-layer coating system applied to the metal wheel.

The substrates may comprise, for example, metallic or non-metallic substrates. Metallic substrates include, but are not limited to, tin, steel (including electrogalvanized steel, cold rolled steel, hot-dipped galvanized steel, among others), magnesium, aluminum, aluminum alloys, zinc-aluminum alloys, steel coated with a zinc-aluminum alloy, and aluminum plated steel. The metallic substrate may comprise aluminum, steel, magnesium, or an alloy thereof. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating composition may be applied to a substrate to form a monocoat. As used herein, a "monocoat" refers to a single layer coating system that is free of additional coating layers. Thus, the coating composition may be applied directly to a substrate and cured to form a single layer coating, i.e., a monocoat. The single coating layer may be applied over a pretreatment layer, as defined hereinafter, which pretreatment layer is not a coating layer. When the curable coating composition is applied to a substrate to form a monocoat, the coating composition may include additional components to provide other desirable properties. For example, the curable coating composition may also include an inorganic component that acts as a corrosion inhibitor. As used herein, a "corrosion inhibitor" refers to a component such as a material, substance, compound, or complex that reduces the rate or severity of corrosion of a surface on a metal or metal alloy substrate. The inorganic component that acts as a corrosion inhibitor may include, but is not limited to, an alkali metal component, an alkaline earth metal component, a transition metal component, or combinations thereof.

The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and/or combinations thereof.

The compositions of the present invention may be used alone, or in combination with one or more other compositions, such as a coating system having two or more coating layers (a multi-layer coating system). A second coating layer may be positioned between the substrate and the first coating layer formed from the coating composition of the present invention.

For example, the compositions of the present invention may comprise a pigment or not and may be used as a primer layer, basecoat, and/or topcoat.

The coating composition may be used to form a primer layer. As described herein, a "primer layer" refers to an undercoating that may be deposited onto a substrate in order to prepare the surface for application of a protective or decorative coating system.

The coating composition may be used to form a topcoat layer. As described herein, a "topcoat" refers to an uppermost coating that is deposited over another coating layer such as a basecoat to provide a protective and/or decorative layer. The topcoat layer may be a pigmented topcoat layer. The topcoat layer may be a clearcoat layer. A clearcoat layer will be understood as a coating layer that is substantially transparent or translucent. A clearcoat layer may therefore have some degree of color, provided it does not make the clearcoat opaque or otherwise affect, to any significant degree, the ability to see the underlying substrate. For example, the coating composition may be used to form a tinted clearcoat layer. As used herein, a "tinted clearcoat layer" refers to a clearcoat layer that comprises greater than 0 weight % and less than 5 weight % of a colorant, or greater than 0 weight % and less than 1 weight % of a colorant, or greater than 0 weight % and less than 0.1 weight % of a colorant, based on solids weight of the coating composition used to form the tinted clearcoat layer. The clearcoat layer may be used, for example, in conjunction with a pigmented basecoat. The coating composition may be used as a topcoat layer over the substrate to provide durability to the substrate.

The coating composition may be used to form a basecoat layer. The multilayer coating system may have a first basecoat and a second basecoat coated over the first basecoat. As described herein, a "basecoat" refers to a coating that is deposited onto a primer and/or directly onto a substrate, optionally including components (such as pigments) that impact the color and/or provide other visual impact. For substrates coated with multiple basecoat layers, one or more of those basecoat layers may be formed from the coating composition as described herein.

The composition may comprise a pigment, such as a pigmented basecoat used in conjunction with a clearcoat, or as a pigmented monocoat. Such coating layers may be used in various industries to impart a decorative and/or protective finish. For example, such a coating or coating system may be applied to a vehicle, such as the wheel of a vehicle. It will be appreciated that the portion of the vehicle that is coated according to the present invention may vary depending on why the coating is being used. When used as a colored basecoat or monocoat, the present coatings may be applied to those portions of the vehicle that are visible such as the roof, hood, doors, trunk lid, and the like of a car, but may also be applied to other areas such as inside the trunk, inside the door and the like especially when the compositions are formulated as sealants or adhesives; for example, the compositions may be formulated so as to have a viscosity such that they provide sound and/or vibration damping to a vehicle. The present compositions may also be applied to those portions of the vehicle that are in contact with the driver and/or passengers, such as the steering wheel, dashboard, gear shift, controls, door handle and the like. Clearcoats may be applied to the exterior of a vehicle.

The substrate may comprise a pretreatment layer positioned over the substrate and the coating formed from the powder coating composition as described herein positioned over at least a portion of the pretreatment layer. As used herein, a "pretreatment layer" refers to a layer formed from a composition that reacts with and chemically alters the substrate surface achieving at least one of the following: 1) formation of a protective layer; 2) improved substrate topography or reactivity to enhance coating adhesion; or 3) formation of a protective layer with improved coating adhesion in comparison to the substrate without pretreatment. The pretreatment layer may form a continuous layer or a discontinuous layer over the surface. Non-limiting examples of pretreatment layer compositions include compositions that comprise iron phosphate, manganese phosphate, zinc phosphate, a rare earth metal, permanganate or manganese, molybdate or molybdenum, zirconium, titanium, hafnium, lanthanides, a silane such as an alkoxysilane, hydrolyzed silanes and silane oligomers and polymers, metal chelates, trivalent chrome (TCP), silicate, silica, phosphonic acids, chromate conversion coating, hydrotalcite, layered double hydroxides, metal oxides, other metals such as Group IV metals, or any combination thereof. Non-limiting examples of organic pretreatments may include chemically modified resins such as phosphatized epoxies, silanized epoxies and amino functional resins. The pretreatment may also include anodizing using, for example, sulfuric acid, nitric acid, hydrofluoric acid, tartaric acid, and/or other anodizing methods. The pretreatment layer composition may be in the form of a sol-gel, a liquid, or a solid. In some instances, a pretreatment may contain or be sealed using an oligomeric or polymeric solution or suspension. In yet other instances, a pretreatment composition may contain small organic molecules with reactive functionality or those which function as corrosion inhibitors. The pretreatment layer may have a thickness of up to 10 microns, or up to 8 microns, or up to 5 microns, or up to 2 microns.

The present invention also relates to a method of reducing filiform corrosion by applying the powder coating composition as described herein to a surface of a substrate. The powder coating composition, once prepared, may be applied to at least a portion of a substrate and cured to form a coating. The powder coating composition may be applied to a substrate using any suitable technique. Suitable methods for applying the powder coating composition to any of the previously described substrates include electrostatic spraying, dipping, and the like. The powder coating may be applied in a single pass or in several passes to provide a film having a thickness after cure of from 1 to 10 mils, such as from 1 to 5 mils. After application, the present compositions may be cured by heating to a temperature of from 120° C. to 220° C., such as from 140° C. to 190° C., such as from 160° C. to 180° C., for a period ranging from 3 minutes to 30 minutes, such as 15 to 25 minutes. Heating may be effected by any means known in the art, such as by placing the coated substrate in an oven. IR radiation may be used to cure the coated substrates.

The powder coating composition may be used to reduce filiform corrosion. As used herein, "filiform corrosion" refers to a type of corrosion that occurs in thin films and coatings characterized by thread-like filament defects on and/or under the surface of the coating. The powder coating composition may form a coating over at least a portion of a substrate and may reduce the amount of filiform corrosion of the coated substrate compared to an identical substrate without the coating formed from the powder coating composition under the same conditions (i.e., same environmental conditions). For example, it was found that the coated substrates of the present invention may provide improved filiform corrosion resistance (tested in accordance with SAE J2635 "Filiform Corrosion Test Procedure for Painted Aluminum Wheels and Painted Aluminum Wheel Trim"), as compared to the same coated substrate that does not include a coating formed from the powder coating composition of the present invention.

EXAMPLES

The following examples are presented to demonstrate the general principles of the invention. The invention should not be considered as limited to the specific examples presented.

Examples 1-7

Preparation of Coating Compositions

Seven (7) curable coating compositions were prepared from the components (measured in grams) listed in Table 1.

TABLE 1

| Component | Comp. Ex. 1 | Comp. Ex. 2 | Ex. 3 | Comp. Ex. 4 | Comp. Ex. 5 | Comp. Ex. 6 | Comp. Ex. 7 |
|---|---|---|---|---|---|---|---|
| POWDERMATE 542DG[1] | 0.63 | 0.63 | 0.63 | 0.63 | 0.63 | 0.63 | 0.63 |
| POWDERMATE 575FL[2] | 1.58 | 1.58 | 1.58 | 1.58 | 1.58 | 1.58 | 1.58 |
| Dodecanedioic acid[3] | 15.45 | — | 3.86 | 5.41 | 7.73 | 11.59 | — |
| ALMATEX PD7610[4] | 84.55 | — | 21.14 | 29.59 | 42.27 | 63.41 | 23.93 |
| URALAC P1550[5] | — | 48.16 | 36.12 | 31.3 | 24.08 | 12.04 | — |
| URALAC P1580[6] | — | 24.08 | 18.06 | 15.65 | 12.04 | 6.02 | — |
| VESTAGON BF 1540[7] | — | 27.76 | 20.82 | 18.05 | 13.88 | 6.94 | — |
| URALAC P800[8] | — | — | — | — | — | — | 76.07 |

[1] an amide-modified phenolated urea surfactant as a degassing agent commercially available from Troy Corporation (Florham Park, NJ)
[2] an amid-ester modified polyether oligomer as a flow and leveling agent commercially available from Troy Corporation (Florham Park, NJ)
[3] a linear difunctional carboxylic acid crosslinker having a carboxylic acid equivalent weight of 115.15 commercially available from Sigma Aldrich (St. Louis, MO)
[4] a glycidyl methacrylate based epoxy-functional acrylic resin commercially available from Anderson Development Company (Adrian, MI)
[5] a hydroxyl-functional polyester resin having a hydroxyl value of 41.5 and an acid value of up to 6 commercially available from DSM (Heerlen, Netherlands)
[6] a hydroxyl-functional polyester resin having a hydroxyl value of 85 and an acid value of up to 10 commercially available from DSM (Heerlen, Netherlands)
[7] a uretdione-functional polyisocyanate adduct crosslinker commercially available from Evonik Industries (Essen, Germany)
[8] an acid-functional polyester resin having an acid value of 28 commercially available from DSM (Heerlen, Netherlands)

For each Example in Table 1, each component was weighed in a container and then all of the components for an Example were combined and mixed together in a Prism high speed mixer for 30 seconds at 2500 RPM to form a dry homogeneous mixture. The mixture was then melt mixed in a Werner Pfleiderer 19 mm twin screw extruder with an aggressive screw configuration and a speed of 500 RPM. The screw of the twin screw extruder comprised four heat zones with the first zone set at 50° C. and the second, third, and fourth zones set at 120° C. The feed rate of the twin screw extruder was such that a torque of 30-45% was observed on the equipment. The mixtures were then milled in a Mikro ACM-1 Air Classifying Mill to obtain an average particle size of 10 microns to 100 microns. Unless otherwise stated, particle size was measured herein using a Beckman-Coulter LS 13 320 Laser Diffraction Particle Size Analyzer using the instructions described in the Beckman-Coulter LS 13 320 manual. The resulting coating compositions for each of the Examples of Table 1 were solid particulate powder coating compositions that were free flowing.

Example 8

Application of Coating Compositions

A-412 Aluminum Q-Panels were cleaned using ULTRAX 14 alkaline cleaner commercially available from PPG Industries, Inc. (Pittsburgh, PA). The panels were then deoxidized in AMC66AW acid etch solution commercially available from PPG Industries, Inc. (Pittsburgh, PA) and then pretreated using XBOND 4000 zirconium pretreatment commercially available from PPG Industries, Inc. (Pittsburgh, PA). Each coating composition of Table 1 was then electrostatically applied to a panel at a filmbuild of 2.5 mils to 5 mils. The coated panels were baked at 177° C. for 20 minutes.

Example 9

Evaluation of Filiform Corrosion Resistance

Each of the coated panels prepared from the coating composition Examples of Table 1 were evaluated for filiform corrosion resistance. The filiform corrosion resistance was determined according to SAE J2635 and listed in Table 2.

TABLE 2

| Example | Avg. Filiform Max. (mm) |
|---|---|
| Comp. Ex. 1 | 8.0 |
| Comp. Ex. 2 | 2.0 |
| Ex. 3 | 2.5 |
| Comp. Ex. 4 | 2.9 |
| Comp. Ex. 5 | 2.4 |
| Comp. Ex. 6 | 5.1 |
| Comp. Ex. 7 | 1.8 |

As shown in Table 2, the Examples with a high amount of hydroxyl functional polyester polymer (Comp. Exs. 2 and 4-5, and Ex. 3) exhibit good filiform corrosion resistance. For example, Comparative Example 6, which includes the lowest amount of hydroxyl functional polyester polymer, is shown to have poor filiform corrosion resistance. Further, Comparative Example 1, which does not include a hydroxyl functional polyester polymer, exhibits the poorest filiform corrosion resistance.

Example 10

Evaluation of Physical Properties

In addition to filiform corrosion resistance, each coated panel was tested for various physical properties and appearance. Adhesion was measured according to ISO 2409. Water immersion adhesion was measured according to NES M0007, 29 (60° C. water immersion for 3 days, followed by crosshatch adhesion). Gasoline resistance testing was conducted according to 4271Z-SNA-A000 (6.18-7 hours in gasoline at room temperature, checking for appearance or adhesion changes). The post-gasoline testing appearance and gloss were measured using a glossmeter and BYK-MAC color reader. The data generated from these tests for each Example is listed in Table 3.

TABLE 3

| Example | Adhesion | Water Immersion Adhesion | Post-Gasoline Testing Appearance | 20° gloss | yellowing (b*-15°) |
|---|---|---|---|---|---|
| Comp. Ex. 1 | 10 | 8 | clear and glossy | 90 | 8.2 |
| Comp. Ex. 2 | 0 | 0 | hazy and yellow | 110 | 8.2 |
| Ex. 3 | 10 | 10 | clear and glossy | 115 | 7.9 |
| Comp. Ex. 4 | 10 | 10 | clear and glossy | 92 | 15.2 |
| Comp. Ex. 5 | 10 | 10 | clear | 31 | 10.8 |
| Comp. Ex. 6 | 10 | 10 | hazy | 57 | 23.9 |
| Comp. Ex. 7 | 0 | 0 | hazy | 101 | 9.3 |

As shown in Table 3, when the amount of acrylic relative to polyester is increased, an increase in yellowing and gloss loss is observed. For example, when moving from Example 3 to Comparative Examples 4-6, the acrylic resin content is increased relative to the polyester content in each subsequent example and more yellowing and lower gloss is observed. It is also observed that in formulations with only polyester and no acrylic resin (Comparative Example 2) no adhesion is observed. Similarly, formulations that only include a carboxylic acid functional polyester (Comparative Example 7) also exhibit no adhesion. By carefully selecting the components of the powder coating compositions as discussed herein, it was unexpected and surprising to find that the coatings formed from the powder coating compositions as discussed herein not only have low filiform corrosion, but also excellent adhesion to the underlying substrate, good gasoline resistance which includes a clear and glossy appearance, and low yellowing.

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition, comprising:

an epoxy functional acrylic polymer present in an amount of from 5 weight % to 53 weight %, based on total resin solids in the powder coating composition;

a hydroxyl functional polyester polymer comprising a first hydroxyl functional polyester polymer having an acid value of up to 10 and a weight average molecular weight of up to 20,000 g/mol, present in an amount of from 15 weight % to 86 weight %, based on the total resin solids in the powder coating composition, and a second hydroxyl functional polyester polymer having a hydroxyl value greater than a hydroxyl value of the first hydroxyl functional polyester polymer present in an amount of from 3 weight % to 40 weight %, based on the total resin solids in the powder coating composition;

an acid functional crosslinker present in an amount of from 2 weight % to 30 weight %, based on the total resin solids in the powder coating composition; and a blocked polyisocyanate crosslinker comprising a uretdione, present in an amount of from 1 weight % to 55 weight %, based on the total resin solids in the powder coating composition, wherein the powder coating composition comprises at least 65 weight % of a combined total of the hydroxyl functional polyester polymer and the blocked polyisocyanate crosslinker, based on the total resin solids in the powder coating composition.

2. The powder coating composition of claim 1, wherein the powder coating composition comprises from 10 weight % to 55 weight % of a combined total of the epoxy functional acrylic polymer and the acid functional crosslinker, based on the total resin solids in the powder coating composition.

3. The powder coating composition of claim 1, wherein the powder coating composition comprises from 5 weight % to 50 weight % of the epoxy functional acrylic polymer, based on the total resin solids in the powder coating composition.

4. The powder coating composition of claim 1, wherein the powder coating composition comprises from 65 weight % to 90 weight % of the combined total of the hydroxyl functional polyester polymer and the blocked polyisocyanate crosslinker, based on the total resin solids in the powder coating composition.

5. The powder coating composition of claim 1, wherein the epoxy functional acrylic polymer is obtained from components comprising: (i) at least one epoxy functional ethylenically unsaturated monomer comprising an amount within a range of greater than 10 weight % and less than 22 weight % of the components that form the epoxy functional acrylic polymer.

6. The powder coating composition of claim 5, wherein (i) the at least one epoxy functional ethylenically unsaturated monomer comprises an epoxy functional (meth)acrylate monomer.

7. The powder coating composition of claim 6, wherein (i) the epoxy functional (meth)acrylate monomer comprises a mono-epoxy functional (meth)acrylate monomer.

8. The powder coating composition of claim 5, wherein the components that form the epoxy functional acrylic polymer further comprise (ii) at least one non-functional ethylenically unsaturated monomer.

9. The powder coating composition of claim 1, wherein the first hydroxyl functional polyester polymer has an acid value of up to 3 and a hydroxyl value of at least 20.

10. The powder coating composition of claim 1, wherein the second hydroxyl functional polyester polymer has an acid value of up to 3 and a hydroxyl value of at least 150.

11. The powder coating composition of claim 1, wherein the first hydroxyl functional polyester polymer is formed from a reaction mixture that is substantially free of an epoxy functional monomer.

12. The powder coating composition of claim 1, wherein the acid functional crosslinker comprises dodecanedioic acid.

13. The powder coating composition of claim 1, wherein the epoxy functional acrylic polymer has a weight average molecular weight of from 2,000 g/mol to 20,000 g/mol.

14. A coated article, comprising:

a substrate; and a first coating layer positioned over at least a portion of the substrate, the first coating layer formed from the powder coating composition of claim 1.

15. The coated article of claim 14, wherein the first coating layer comprises a topcoat layer.

16. The coated article of claim 14, further comprising a second coating layer positioned between the first coating layer and the portion of the substrate.

17. The coated article of claim 14, wherein the substrate comprises aluminum, steel, magnesium, or an alloy thereof.

18. The coated article of claim 14, wherein the substrate comprises a wheel.

19. A method of reducing filiform corrosion, comprising:

applying a powder coating composition of claim 1 to a surface of a substrate.

* * * * *